United States Patent Office 3,160,624
Patented Dec. 8, 1964

3,160,624
PROCESS FOR THE PREPARATION OF DL-RIBOSE AND DL-ARABINOSE
Issei Iwai and Tadahiro Iwashige, Tokyo, Japan, assignors to Sankyo Company, Limited, Tokyo, Japan
No Drawing. Filed June 13, 1961, Ser. No. 116,677
Claims priority, application Japan June 18, 1960
1 Claim. (Cl. 260—209)

This invention is concerned with a process for preparing $dl$-ribose and $dl$-arabinose.

A number of processes have been heretofore known for preparing ribose and arabinose. However, in these processes they are prepared by conversion of other monosaccharides, extraction from natural sources or synthesis from compounds with less carbon atoms by means of enzymatic actions but not by total synthesis from the simple and easily available starting material. Accordingly, they are not commercially advantageous.

It is an object of this invention to provide a process for preparing $dl$-ribose and $dl$-arabinose by total synthesis. Other objects will be apparent from descriptions hereinbelow.

As a result of time-consuming studies for discovering process for preparing $dl$-ribose and $dl$-arabinose, we have succeeded in the preparation by total synthesis.

According to the present invention, $dl$-ribose and $dl$-arabinose may be prepared by reacting a glyoxal hemiacetal having the general formula $$CHO-CH(OR_1)_2 \quad (I)$$

wherein $R_1$ is selected from the group consisting of alkyl group containing 1 to 5 carbon atoms, phenyl group and benzyl group with a Grignard reagent having the general formula $$R_2-O-CH_2-C\equiv C-MgX \quad (II)$$

wherein X is halogen and $R_2$ is selected from the group consisting of 2-tetrahydropyranyl, 2-tetrahydrofuryl, benzyl and alkoxyethyl groups containing 1 to 5 carbon atoms in the alkyl moiety to produce a $dl$-1,1-dialkoxy-, phenoxy-, or benzyloxy-pent-3-yne-2,5-diol derivative having the general formula

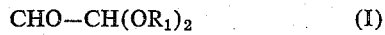
(III)

wherein $R_1$ and $R_2$ are as defined above, hydrogenating the latter compound in the presence of a hydrogenation catalyst until 1 mole of hydrogen is absorbed to produce $dl$-cis-1,1-dialkoxy-, phenoxy-, or benzyloxy-pent-3-ene-2,5-diol derivative having the general formula

(IV)

wherein $R_1$ and $R_2$ are as defined above, reacting the latter compound with an acylating agent to produce a $dl$-cis-1,1-dialkoxy-, phenoxy-, or benzyloxy-pent-ene-2-O-acyl-5-ol derivative having the general formula

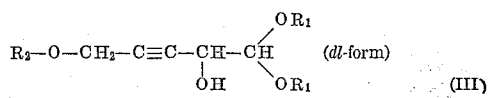
(V)

wherein $R_3$ is selected from the group consisting of lower alkyl and phenyl groups and $R_1$ and $R_2$ are as defined above, reacting the latter compound with an oxidizing agent to form a mixture of 5-O-substituted-2-O-acyl-$dl$-ribose dialkyl-, phenyl-, or benzyl-acetal having the general formula

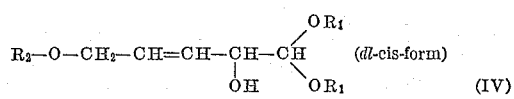
(VI)

wherein $R_1$, $R_2$ and $R_3$ are as defined above and 5-O-substituted-2-O-acyl-$dl$-arabinose dialkyl-, phenyl-, or benzyl-acetal having the general formula

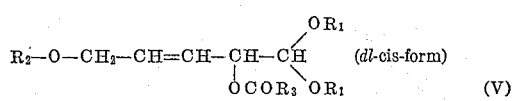
(VII)

wherein $R_1$, $R_2$ and $R_3$ are as defined above, treating the resulting mixture with a mineral acid thereby converting $R_2O$ radical at 5-position and $-OCOR_3$ radical at 2-position to $-OH$ respectively and converting the acetal radical at 1-position to aldehyde radical and separating the resulting mixture into $dl$-ribose and $dl$-arabinose. These reactions in the process according to the present invention may be illustrated by the following equation:

$$CHO-CH(OR_1)_2 \ (I) \quad R_2-O-CH_2-C\equiv C-MgX \ (II)$$

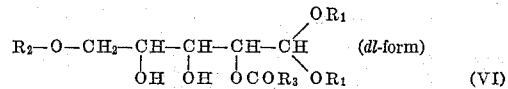
(III)

↓ Hydrogenation

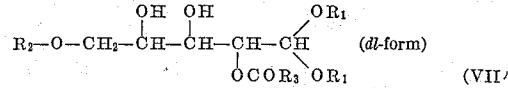
(IV)

↓ Acylation

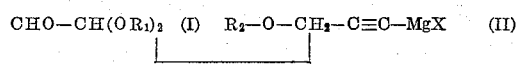
(V)

↓ Oxidation

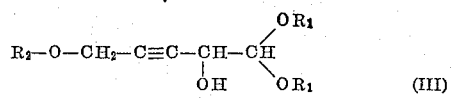
(VI)

+

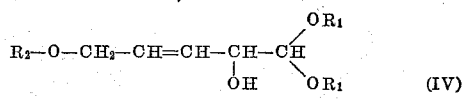
(VII)

↓ Mineral acid $dl$-Ribose
+
$dl$-Arabinose

↓ Separation $dl$-Ribose   $dl$-Arabinose

In accordance with the preferred procedure of the first step in carrying out the process of the invention, ether derivative of propargyl alcohol having the formula $R_2OCH_2C \equiv CH$ in which $R_2$ is as defined above, alkyl halide and metallic magnesium is reacted at room temperature in an inert solvent such as diethyl ether, tetrahydrofuran or benzene to form Grignard reagent having the above-described Formula II, followed by reaction of the latter with glyoxal hemiacetal of the above-described Formula I by gradually dropwise adding a solution of said acetal in the solvent as aforementioned at room temperature. After completion of the reaction, the reaction product which is dl-1,1-dialkoxy-, phenoxy-, or benzyloxy-pent-3-yne - 2,5 - diol derivative may be isolated from the reaction mixture by one of the conventional methods. For example, when tetrahydrofuran is used as the reaction solvent, the reaction mixture is poured onto a cold saturated aqueous solution of ammonium chloride, followed by separation of the tetrahydrofuran layer; the aqueous layer is extracted with a small amount of diethyl ether and combined tetrahydrofuran and ether extracts are dried over a suitable drying agent such as sodium sulfate, followed by distillating off the solvent; the residue is subjected to usual vacuum distillation to obtain the desired product (III).

The second step in the process according to the present invention, reduction step, may be effected by hydrogenating the dl-1,1-dialkoxy-, phenoxy-, or benzyloxy-pent-3-yne-2,5-diol derivative (III) obtained in the first step by means of a reduction catalyst such as palladium, platinum or nickel in an inert solvent such as ethyl acetate, chloroform or lower alcohol until one-molar equivalent of hydrogen is absorbed. dl-cis-1,1-dialkoxy-, phenoxy- or benzyloxy-pent-3-ene-2,5-diol derivative is thereby formed. After completion of the hydrogenation reaction, the catalyst is separated from the reaction mixture by filtration and the filtrate is heated to remove the solvent; the residue is subjected to vacuum distillation to obtain the desired product, dl-cis-1,1-dialkoxy-, phenoxy- or benzyloxy-pent-3-ene-2,5-diol derivative (IV).

Acylation which is the third step of the process according to the present invention, is carried out by reacting dl-cis-1,1-dialkoxy-, phenoxy- or benzyloxy-pent-3-ene-2,5-diol derivative (IV) obtained in the second step with a usual acylating agent, acid anhydride such as acetic or benzoic anhydride, acid halide such as acetyl or benzoyl chloride or the like in the presence of inert solvent such as chloroform and pyridine. When an acid anhydride such as acetic anhydride is used as the acylating agent, a large amount of the acid anhydride may be employed both for the acylating agent and for the solvent. After completion of the reaction, the reaction product of the aforementioned Formula V may be isolated from the reaction mixture by one of the conventional means. For example, in the preferred embodiment, after completion of the reaction the solvent is distilled off and the residue is poured onto ice water; the oily material thus formed is extracted with ether and the solvent is removed from the extract; then the residue is subjected to distillation to isolate the desired product.

The fourth step, oxidation, is effected by subjecting dl-cis-1,1-dialkoxy-, phenoxy- or benzyloxy-pent-3-ene-2-O-acyl-5-ol derivative of the aforementioned Formula V obtained in the above-described acylation step to oxidation with an oxidizing agent such as a per manganate, for example, potassium or sodium permanganate or the like, osmium tetraoxide or hydrogen peroxide. After completion of the reaction the oxidized product is isolated, for example, by filtering the reaction mixture to remove manganese dioxide formed in case of potassium permanganate used as the oxidizing agent, usually treating the aqueous solution obtained in the filtration with weakly acidic cation-exchange resin such as Amberlite IRC–50 to remove the potassium ion contained therein and concentrating the aqueous solution thus obtained in vacuum at room temperature to give a residual syrup which is the crude oxidation product.

Hydrolysis of the fifth step is carried out by treating the mixture of compounds of the aforementioned Formulae VI and VII obtained in the above-described oxidation step with a mineral acid such as hydrochloric or sulfuric acid to convert $R_2O$ at 5 position and $—OCOR_3$ at 2-position to —OH respectively, and convert the acetal radical at 1-position to aldehyde radical. Usually, the reaction is completed by allowing the mixture of Compounds VI and VII to stand at room temperature in the presence of the mineral acid for several days. After completion of the reaction, the reaction mixture is treated with weakly basic anion-exchange resin such as Amberlite IR–4B to give a neutral aqueous solution, which is then concentrated in vacuum at room temperature to give a mixture of crude dl-ribose and dl-arabinose.

The final step for separation of dl-ribose and dl-arabinose is effected by subjecting the mixture of dl-ribose and dl-arabinose obtained in the fifth step of hydrolysis to cellulose powder column-chromatography using a lower alcohol such as n-butanol or pyridine as an eluting agent or ion-exchange resin chromatography. For example, separation of the saccharide mixture is carried out by chromatographing on the strongly basic anion-exchange resins (which are prepared from styrene-divinyl benzene-copolymers) of quaternary ammonium salt type such as Dowex–1 in the form of borate using an aqueous solution of potassium borate as an agent for developing and eluting.

The following examples illustrate the invention, but should not be deemed to limit the invention, since equivalents to the embodiments specifically described will be obvious to those skilled in the art.

EXAMPLE

Preparation of dl-1,1-Diethoxy-5-(Tetrahydropyran-2-yl) Oxy-Pent-3-yn-2-ol

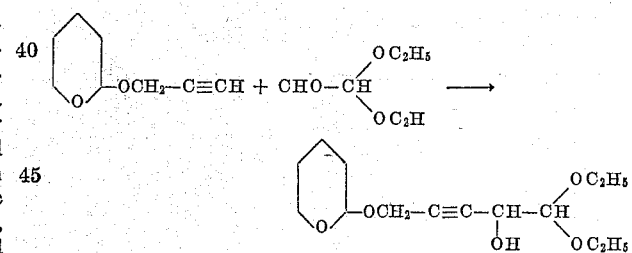

To a Grignard reagent prepared from 43.5 g. of ethyl bromide and 8.75 g. of metallic magnesium in 190 ml. of dry diethyl ether are added 130 ml. of dry tetrahydrofuran. A solution of 46.2 g. of 3-(tetrahydropyran-2-yl) oxy-prop-1-yne in 35 ml. of dry diethyl ether is added dropwise to the above mixture at room temperature during about one hour, during which period vigorous evolution of ethane gas is observed. Stirring is continued for additional 30 min. followed by dropwise addition of a solution of 36.5 g. of glyoxal hemiacetal in 100 ml. of dry ether. Temperature rises by about 10° C. during the addition. After stirring for additional one hour at room temperature the reaction mixture is allowed to stand overnight and then decomposed with a cold saturated aqueous solution of ammonium chloride followed by separation of the organic layer. The aqueous layer is further extracted with about 200 ml. of diethyl ether. Combined organic layers are dried over sodium sulfate and the solvent is distilled off. The residue is subjected to vacuum distillation to give 43.0 g. of almost colorless viscous oil, $B.P._{0.2}$ 140–141° C., $n_D^{22}$ 1.4716, $d_{18}$ 1.0756. Twenty grams of the starting material, 3-(tetrahydropyran-2-yl) oxy-prop-1-yne is recovered.

Analysis.—Found: C, 61.83; H, 8.80. Calc'd for $C_{14}H_{24}O_5$: C, 61.75; H, 8.82. Molecular refraction—

Found: 70.70. Calc'd: 70.80. Infrared absorption spectrum:

$V_{max.}^{CCl_4}$ cm.$^{-1}$ 3300–3500 (—OH); 900–1150 (—C—O—C—)

*Preparation of dl-Cis-1,1-Diethoxy-5-(Tetrahydropyran-2-yl) Oxy-Pent-3-en-2-ol*

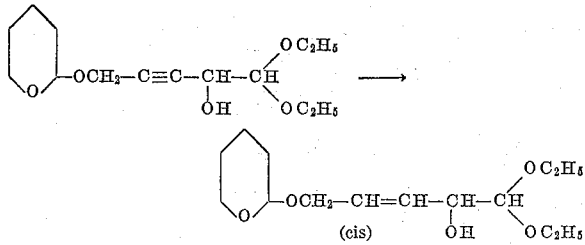

A mixture of 27.2 g. of dl-1,1-diethoxy-5-(tetrahydropyran-2-yl) oxy-pent-3-yn-2-ol, 9.5 g. of Lindlar's catalyst (Pd—CaCO₃) and 500 ml. of ethyl acetate is subjected to hydrogenation by shaking under atmosphere of hydrogen at ordinary pressure. The end point of the reaction can be easily found by sudden slow down of hydrogen absorption when 1 molar equivalent of hydrogen is absorbed. After completion of the reaction the catalyst is separated by filtration and the solvent is distilled off from the filtrate. The residue is subjected to vacuum distillation to give 24.2 g. of colorless viscous oil, B.P.$_{0.08}$ 177–118° C., $n_D^{20}$ 1.4654.

*Analysis.*—Found: C, 61.36; H, 9.31. Calc'd for $C_{14}H_{26}O_5$: C, 61.30; H, 9.49. Infrared absorption spectrum:

$V_{max.}^{CCl_4}$ cm.$^{-1}$ 3300–3500 (—OH); 1150–900 (—C—O—C—)

Use of Pd—C catalyst instead of Lindlar's catalyst gives the desired product in the same way.

*Preparation of dl-Cis-1,1-Diethoxy-2-Acetoxy-5-(Tetrahydropyran-2-yl) Oxy-Pent-3-ene*

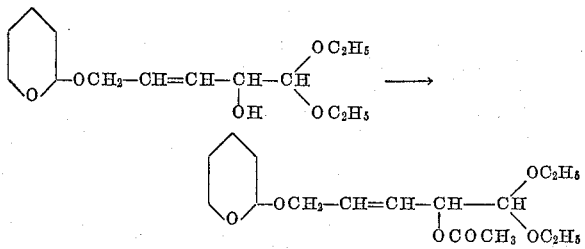

A solution of 25.6 g. of dl-cis-1,1-diethoxy-5-(tetrahydropyran-2-yl) oxy-pent-3-en-2-ol and 102.3 g. of acetic anhydride in 256 ml. of dry pyridine is heated under reflux for about 3 hours. After cooled, excess pyridine and acetic anhydride are distilled off in vacuum on a water bath. The residue is poured onto ice water and the oil separated is then extracted with diethyl ether. The ether layer is washed with water, 5% sodium carbonate solution and again with water and dried over sodium sulfate. The solvent is distilled off and the residue is subjected to vacuum distillation to give yellow viscous oil, B.P.$_{0.2}$ 123–126° C., $n_D^{18}$ 1.4566.

*Analysis.*—Found: C, 60.89; H, 8.79. Calc'd for $C_{16}H_{28}O_6$: C, 60.75; H, 8.86. Infrared absorption spectrum:

$V_{max.}^{CCl_4}$ cm.$^{-1}$ 1750 and 1240 (—OCOCH₃);
1150–900 (—C—O—C—)

*Preparation of 5-O-(Tetrahydropyran-2-Yl)-2-O-Acetyl-dl-Ribose Diethylacetal and 5-O-(Tetrahydropyran-2-Yl)-2-O-Acetyl-dl-Arabinose Diethylacetal*

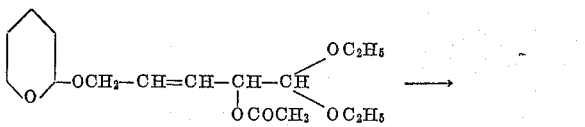

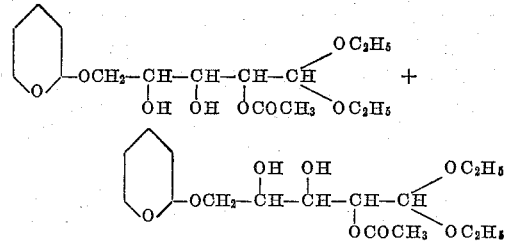

To a suspension of 11.7 g. of dl-cis-1,1-diethoxy-2-acetoxy-5-(tetrahydropyran-2-yl)-oxy-pent-3-ene in 175 ml. of water is added dropwise a solution of 4.4 g. of potassium permanganate in 300 ml. of water during about one hour while stirring the reaction mixture and maintaining the reaction temperature between 1° C. and 3° C. with ice. The resulting mixture is allowed to stand at room temperature for about 30 min. until colloidal manganese dioxide crystallizes. Crystallized manganese dioxide is then separated by filtration and washed with several portions of a small amount of water. The combined aqueous solution and washings are passed through Amberlite IRC-50 and the filtrate is concentrated under vacuum at room temperature to obtain 12.5 g. of a hygroscopic syrup. This substance gives positive reaction with periodic acid-silver nitrate reagent indicative of —glycol radical and negative Benedict reaction.

*Preparation of dl-Ribose and dl-Arabinose*

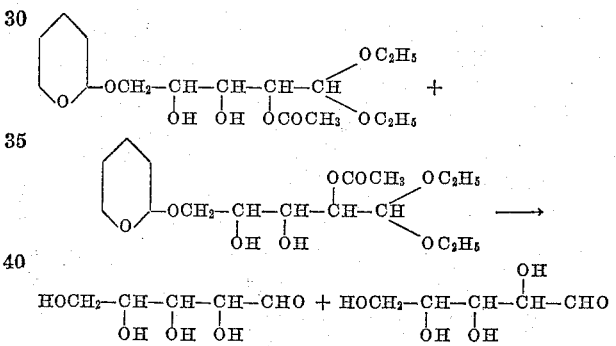

To a solution of 12.5 g. of the crude mixture of 5-O-tetrahydropyran-2-yl)-2 - O - acetyl-dl-ribose diethylacetal and 5 - O - (tetrahydropyran-2-yl)-2-O-acetal-dl-arabinose diethylacetal in 175 ml. of water are added 30 ml. of concentrated hydrochloric acid and the mixture is allowed to stand at room temperature for three days. The reaction mixture is passed through Amberlite IR-4B and the resulting aqueous solution is concentrated in vacuum at room temperature to obtain 6.0 g. of reddish brown syrup. The syrup is column-chromatographed on cellulose powders of 100–200 mesh at 60° C. using n-butanol saturated with water as a developing agent. Examination of the eluate by paper-chromatography reveals that three fractions of Rƒ 0.32, 0.26, and 0.32 and 0.26 respectively exist; total yield 2.9 g. (Developing solvent, butanol: water:acetic acid (4:5:1); temperature, 20° C.; control, d-ribose Rƒ=0.32, d-arabinose Rƒ=0.26; detecting reagent, partridge).

Syrupy substance obtained from the fraction of Rƒ 0.26 gives benzoylhydrazone melting at 188–189° C. (decomposed) upon heating under reflux with benzoylhydrazine in methanol. dl-Arabinose benzoylhydrazone prepared from a mixture of equal amount of d-arabinose benzoylhydrazone and l-arabinose benzoylhydrazone melts at 189–190° C. (decomposed) and mixed M.P. with the above-mentioned benzoylhydrazone is not depressed. Identity of the infrared absorption spectra of the two also demonstrates identity of the product with dl-arabinose.

*Analysis.*—Found: C, 53.96; H, 6.13; N, 10.27. Calc'd for $C_{12}H_{16}O_5N_2$: C, 53.75; H, 5.97; N, 10.45.

A mixture of syrup obtained from the fraction of $Rf=0.32$, pyridine and propionic anhydride is allowed to stand at room temperature for three days to obtain very viscous colorless oil, B.P.$_{3\times10}$—4 160–170° C. (both temperature). Under the same conditions, $d$-ribose gives $d$-ribose tetrapropionate, B.P.$_{3\times10}$—4 160–170° C. Infrared absorption spectra of chloroform solutions of the two are quite identical to demonstrate that the syrup of $Rf$ 0.32 is $dl$-ribose.

*Analysis.*—Found: C, 54.71; H, 7.03. Calc'd for $C_{17}H_{26}O_9$: C, 54.60; H, 6.95.

We claim:

A process for the preparation of $dl$-ribose and $dl$-arabinose which comprises reacting a compound having the formula

$$R_2OCH_2C{\equiv}CH$$

wherein $R_2$ is selected from the group consisting of 2-tetrahydropyranyl, 2-tetrahydrofuryl, unsubstituted benzyl and alkoxyethyl groups containing 1 to 5 carbon atoms in the alkyl moiety with alkyl halide and metallic magnesium in an inert solvent to produce a compound having the formula

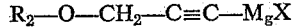
$$R_2{-}O{-}CH_2{-}C{\equiv}C{-}M_gX$$

wherein $R_2$ has the same meaning as described above and X is halogen atom, reacting the latter compound with a compound having the formula

$$CHO{-}CH(OR_1)_2$$

wherein $R_1$ is selected from the group consisting of alkyl group containing 1 to 5 carbon atoms, unsubstituted phenyl group and unsubstituted benzyl group to produce a compound having the formula

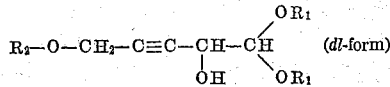
($dl$-form)

wherein $R_1$ and $R_2$ have the same meaning as described above, hydrogenating the latter compound in the presence of a hydrogenation catalyst in an inert solvent until 1 mole of hydrogen is absorbed to produce a compound having the formula

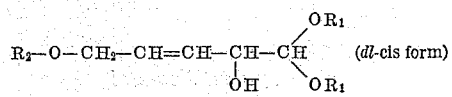
($dl$-cis form)

wherein $R_1$ and $R_2$ have the same meaning as described above, reacting the latter compound with an acylating agent in an inert solvent under reflux to produce a compound having the formula

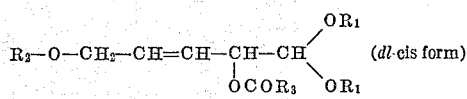
($dl$-cis form)

wherein $R_3$ is selected from the group consisting of lower alkyl and unsubstituted phenyl groups and $R_1$ and $R_2$ have the same meaning as described above, reacting the latter compound with an oxidizing agent to form a mixture of a compound having the formula

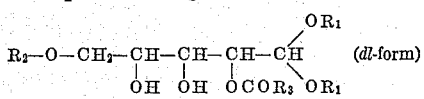
($dl$-form)

wherein $R_1$, $R_2$ and $R_3$ have the same meaning as described above and a compound having the formula

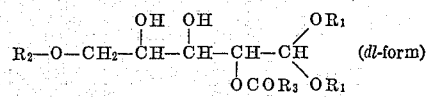
($dl$-form)

wherein $R_1$, $R_2$ and $R_3$ have the same meaning as described above, treating the resulting mixture with a mineral acid to produce a mixture of $dl$-ribose and $dl$-arabinose and subjecting the resulting mixture to chromatography to separate the mixture into $dl$-ribose and $dl$-arabinose.

References Cited in the file of this patent

UNITED STATES PATENTS

| | | |
|---|---|---|
| 2,152,662 | Phelps | Apr. 4, 1939 |
| 2,162,721 | Hudson et al. | June 20, 1939 |